No. 11,693.

Reissued Sept. 20, 1898.

D. W. DAVIS.

RAIL BRAKE.

(Application filed Mar. 5, 1898.)

WITNESSES

A. Wilson

A. J. Burke

INVENTOR

D. W. Davis

BY C. J. Bailey

ATTORNEY.

UNITED STATES PATENT OFFICE.

DAVID W. DAVIS, OF DETROIT, MICHIGAN, ASSIGNOR TO THE DAVIS RAIL-BRAKE COMPANY, OF SAME PLACE.

RAIL-BRAKE

SPECIFICATION forming part of Reissued Letters Patent No. 11,693, dated September 20, 1898.

Original No. 581,270, dated April 27, 1897. Application for reissue filed March 5, 1898. Serial No. 672,788.

*To all whom it may concern:*

Be it known that I, DAVID W. DAVIS, a citizen of the United States, and a resident of Detroit, in the county of Wayne, State of Michigan, have invented certain new and useful Improvements in Rail-Brakes, of which the following is a specification.

The object of my invention is to provide a simple, readily-applied, and easily-operated brake for cars, and it has special reference to the class known as "rail-brakes," wherein the tractive force is applied directly to the rails without using the wheels as a portion of the intermediate mechanism. In this class of appliances it is customary to use the trucks or the body of the car, or both of these elements, in order to secure a fulcrum for the action of the braking chain or lever. In some instances the braking mechanism is attached to one or both axles; but in such cases the mechanism swings on the axle, using the latter as a fulcrum, and for obvious reasons such structures have been found to be inefficient, difficult to apply, and greatly objectionable from a mechanical standpoint.

My invention consists in providing a braking mechanism which is wholly attached to the axles of a car. It is a rigid frame constructed in such a manner as to be unaffected by the inequalities of the track, and to this rigid frame I secure all the operative parts, all of which will now be set forth in detail.

Figure 1:
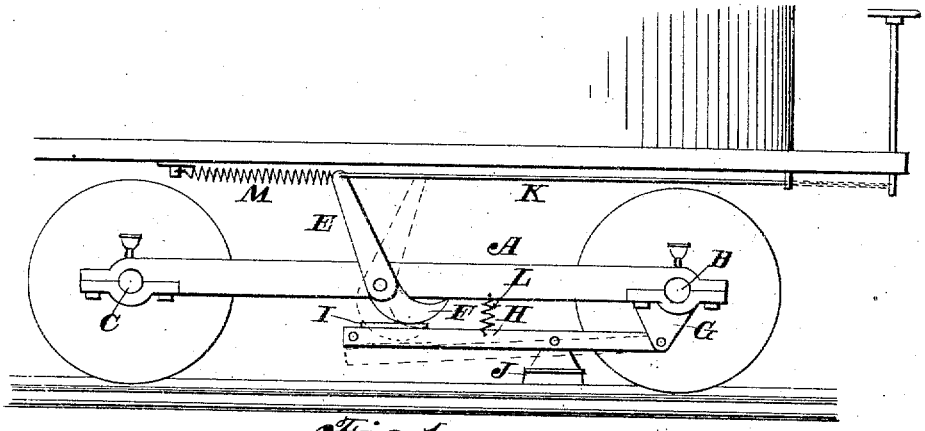
Figure 2:
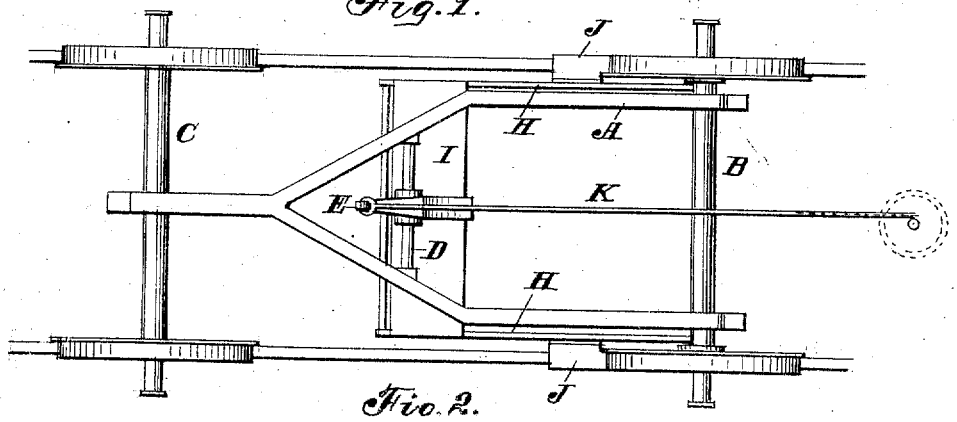
Figure 3:
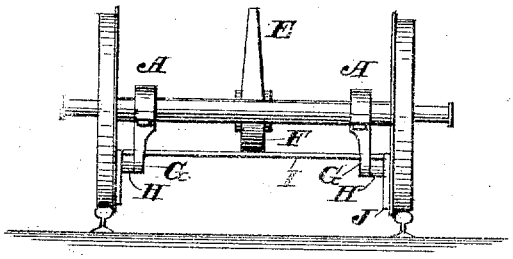

In the accompanying drawings, Figure 1 is a vertical longitudinal section of the end of a car along the line *x*, showing the wheels equipped with my improved rail-brake. Fig. 2 is a top view, and Fig. 3 an end view.

In the drawings herein I do not show any portion of the car-trucks, but merely the wheels, axle, and car-body, for the reason that the truck is not in any manner an element or portion of the structure necessary to my invention, and it is omitted, so that less confusion will arise in describing and illustrating the features of the invention. It is sufficient to say that no special preparation is required to prepare the car-truck to receive this braking appliance, because all the parts of the invention are so made that when once the proper axle-diameters and their distance apart from centers are ascertained the apparatus can be attached at a moment's notice with the certainty that it will fit in position. This is an important feature in the equipment of old cars, since the loss of time in equipping cars ordinarily is a greater loss than the cost for material and labor in applying same.

In constructing my invention I provide a frame A, which in this instance is bifurcated in form, the ends of the two forward limbs of which are provided with journal-boxes, in which the front axle B is journaled, while the rear end of the frame has its single limb also provided with a boxing in which the middle of the rear axle C is journaled. I prefer this form of frame, as its structure while being rigid at the same time allows the wheels to ride over the inequalities of the track without affecting the braking mechanism secured to the frame. At a point centrally between the axles, approximately, is a cross-horizontal bar D, journaled between the limbs of the frame A, and midway between the limbs of the frame is a vertically-disposed lever E, the upper end of which has an eye, to which the brake rod or chain is attached. The low end of the lever, below the pivot-bar D, has a cam F. At the forward end of each of the legs of the frame A and preferably directly beneath the axles I have placed a depending bracket G, at the lower end of which I hinge the forward end of a horizontal lever H. These levers are a short distance above the track-rails, and their rear ends are secured together by means of a cross-bar I, which bar is directly beneath the cam F.

A short distance behind the pivot-pin of each bracket G is a brake-block J, pivotally secured to the lever H and so located that when the rear end of the lever H is depressed the brake-blocks J will rest on the car track or rails and produce the braking effect through the operation of the cam-lever E and the brake rod or chain K, which extends forward to the brake-stem.

In order to provide a means for releasing the brake-block from the rail when the pressure is released on the upper end of the cam-lever E, a retractile spring L is placed between the rear end of each lever H and the frame A, and a spring M, with one end attached to the upper end of the cam-lever and the other end to the under side of the car-body or to the frame A, serves to throw back the lever to its normal position and release the cam. In this structure and arrangement it will be observed that there is, first, a rigid frame secured to the truck-axles and entirely disconnected from the truck; second, the wheels are not in any manner employed in the train of mechanism between the brake-stem or brake-block on the track, and, third, none of the mechanism is attached to the car-body except the chain or bar K and the retractile spring M.

As heretofore stated, the advantage of having a braking structure made independently of the car-track and so arranged that it can be applied to the truck without any special preparation on or change in the truck enables the mechanic to much more readily and quickly apply it to any car.

What I claim as new is—

1. A rail-brake for cars, having a rigid bifurcated frame, with the forward axle journaled through the two parallel limbs, and the rear axle journaled through the end of the single limb, in combination with a pair of horizontal levers hinged to the forward ends of the frame and having brake-blocks thereon and a single cam-lever operating the two horizontal levers, substantially as set forth.

2. In a car the combination with axles of a bifurcated frame journaled thereon, and brackets secured thereto, of levers pivoted to said brackets, depending brake-shoes pivotally connected with said levers, a transverse bar connecting the free ends of said levers, a cam-lever bearing upon said bar and means for normally holding the brake-shoes away from the rails, substantially as set forth.

3. In a car, the combination with axles of a bifurcated frame, journaled thereon, and brackets secured thereto, of levers pivoted to said brackets, depending brake-shoes pivotally connected with said levers, coiled retractile springs secured to said levers and to the frame, a transverse bar connecting the free ends of said levers, a rod secured to said brace, a cam-lever journaled thereon bearing on said bar, and a coiled spring secured to said lever, substantially as set forth.

DAVID W. DAVIS.

Witnesses:
H. M. McCORMICK,
JNO. C. TOBIAS.